United States Patent [19]
Kikkawa et al.

[11] Patent Number: 5,859,101
[45] Date of Patent: Jan. 12, 1999

[54] RUBBER COMPOSITION FOR TIRE

[75] Inventors: Atsushi Kikkawa; Masayuki Kawazoe; Yoshiaki Sakamaki; Mitsuo Sakurai; Koichi Horie; Issey Nakakita, all of Hiratsuka, Japan

[73] Assignee: The Yokohama Rubber Co. Ltd., Tokyo, Japan

[21] Appl. No.: 811,345

[22] Filed: Mar. 4, 1997

[30]  Foreign Application Priority Data

| Mar. 4, 1996 | [JP] | Japan | 8-046390 |
| Dec. 2, 1996 | [JP] | Japan | 8-321887 |
| Jan. 28, 1997 | [JP] | Japan | 9-014077 |

[51] Int. Cl.⁶ ..................... C08K 5/15
[52] U.S. Cl. ............... 524/110; 524/103; 524/308; 524/316; 524/320
[58] Field of Search .............. 524/308, 316, 524/103, 446, 110, 284

[56] References Cited

U.S. PATENT DOCUMENTS

| 3,929,804 | 12/1975 | Cook | 524/103 |
| 4,143,423 | 3/1979 | Sternlieb | 2/168 |
| 4,304,707 | 12/1981 | Kuehn | 524/316 |
| 4,859,744 | 8/1989 | Lindner | 525/310 |
| 5,073,366 | 12/1991 | Moltrasio | 524/308 |
| 5,270,060 | 12/1993 | Foster | 426/3 |
| 5,384,349 | 1/1995 | Trepka | 524/111 |
| 5,457,216 | 10/1995 | Kleinknecht | 524/110 |
| 5,525,646 | 6/1996 | Lundgren | 524/308 |
| 5,629,363 | 5/1997 | Abber | 524/466 |

*Primary Examiner*—Paul R. Michl
*Attorney, Agent, or Firm*—Nikaido, Marmelstein, Murray & Oram LLP

[57] ABSTRACT

A rubber composition for a tire, comprising at least one compound selected from the group consisting of ascorbic acid and derivatives thereof, tocopherols, and citric acid and derivatives thereof.

13 Claims, 1 Drawing Sheet

RUBBER COMPOSITION FOR TIRE

BACKGROUND OF THE INVENTION

The present invention relates to a rubber composition, for a tire, which can improve tire durability.

Blending of polybutadiene rubber, use of carbon black having a small particle diameter, EV (effective vulcanization), use of a semi-EV type vulcanization accelerator and the like have hitherto been attempted to enhance the abrasion resistance of a rubber composition for a tire tread and thereby improve the durability of the tire. These means, however, generally deteriorate the wet performance, heat build-up, fracture properties and other properties, and it has been difficult to significantly improve the abrasion resistance while minimizing the influence on such other properties.

Further, good crack resistance is required of rubber compositions for a side wall, a rim cushion, or an inner liner of a tire, and there is a demand for use of a rubber composition having excellent fatigue resistance in a belt layer, a carcass layer, or a bead filler. Up to now, however, no rubber composition having satisfactory crack resistance and fatigue resistance has been proposed in the art.

SUMMARY OF THE INVENTION

An object of the present invention is to provide a rubber composition, for a tire, which can improve the abrasion resistance without sacrificing the wet performance (wet road grip force), fracture properties, and heat build-up and, at the same time, has enhanced crack resistance and fatigue resistance and, hence, can improve the tire durability.

According to the present invention, the above object can be attained by a rubber composition for a tire, comprising at least one compound selected from the group consisting of ascorbic acid and derivatives thereof, tocopherols, and citric acid and derivatives thereof.

The use of this rubber composition in a tire tread results in improved abrasion resistance of the tread without substantially sacrificing wet performance, fracture properties, and heat-build up, enhancing the tire durability.

Further, the use of the above rubber composition in a side wall, a rim cushion, and/or an inner liner results in improved crack resistance of these sections of the tire, enhancing the tire durability.

Furthermore, the use of above rubber composition in a belt layer, a carcass layer, and/or a bead filler of the tire results in improved fatigue resistance of these sections of the tire, enhancing the tire durability.

DESCRIPTION OF THE PREFERRED EMBODIMENTS

Figure 1:
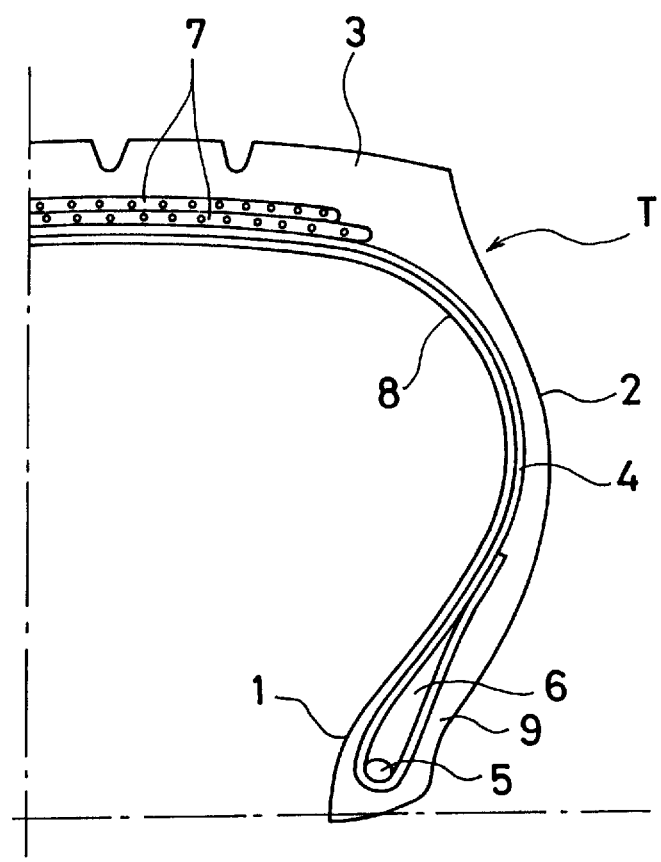
FIG. 1 is a meridian half cross-sectional view of one embodiment of each section constituting a tire using the rubber composition for a tire according to the present invention.

One embodiment of each section constituting a tire using the rubber composition for a tire according to the present invention is shown in FIG. 1. In FIG. 1, a tire T comprises a pair of right and left bead sections 1, a pair of right and left side walls 2, and a tread 3 extending to both the side walls. A carcass layer 4 is provided between the bead sections 1,1, and the end portion of the carcass layer 4 is folded back and wound up around a bead core 5 and a bead filler 6 from the inner side of the tire towards the outer side of the tire. In the tread 3, a belt layer 7 is disposed on the outer side of the carcass layer 4 over one round of the tire. An inner liner 8 is provided over the surface of inside of the tire T to prevent air filled in the interior of the tire from being leaked out. A rim cushion 9 comprising a rubber composition having relatively high hardness is disposed in the bead section 1 in its portion in contact with the rim.

The rubber composition for a tire according to the present invention may be used to constitute the tread 3, the side wall 2, the rim cushion 9, the inner liner 8, the belt layer 7, the carcass layer 4, and/or the bead filler 6.

The ascorbic acid and its derivatives according to the present invention are compounds represented by the following formula (1). Examples thereof include ascorbic acid (vitamin C) represented by the following formula and an ester of ascorbic acid with a carboxylic acid, that is, ascorbyl stearate or ascorbyl palmitate. A salt of ascorbic acid with an alkali metal or an alkaline earth metal (for example, magnesium ascorbate represented by the following formula) may also be used. In the rubber composition, the metal salt reacts with an acid, such as stearic acid, to return to ascorbic acid.

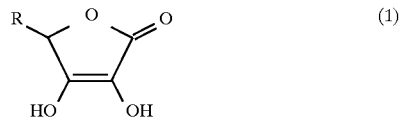

(R represents any group)

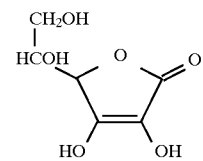

Ascorbic acid

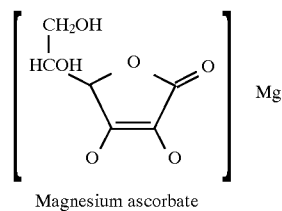

Magnesium ascorbate

Tocopherols include, for example, α-tocopherol (vitamin E) represented by the following formula (2), β-tocopherol, γ-tocopherol, δ-tocopherol, $\xi_2$-tocopherol, and η-tocopherol represented by the following formulae, ε-tocopherol represented by the following formula (3), and $\xi_1$-tocopherol represented by the following formula.

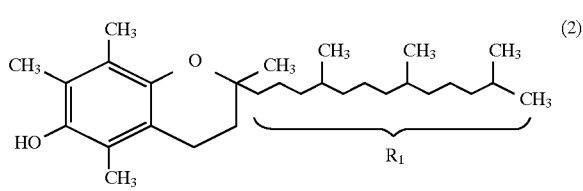

(wherein R₁ represents a part of skeleton)

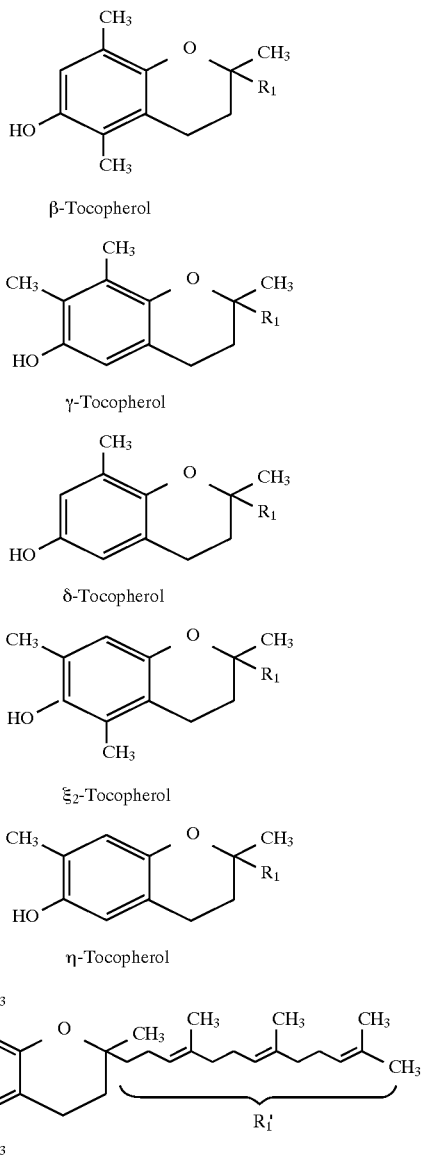

wherein R₁ represents a part of skeleton)

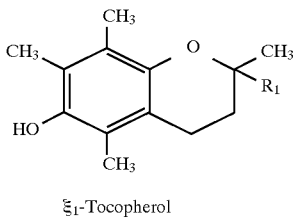

Citric acid and its derivatives are represented by the following formula (4), and examples thereof include citric acid represented by the following formula and an ester of citric acid with an alcohol, such as triallyl citrate. A salt of citric acid with an alkali metal or an alkaline earth metal (for example, magnesium citrate represented by the following formula) may also be used. In the rubber composition, the metal salt can react with an acid, such as stearic acid, to return to citric acid.

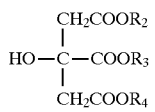

(wherein $R_2$, $R_3$, and $R_4$ which may be the same or different represent any group and has a bond between these groups)

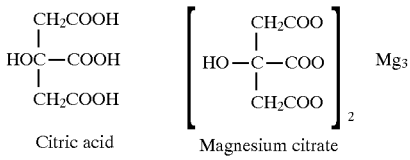

Citric acid      Magnesium citrate

The rubber composition for a tire according to the present invention comprises at least one compound selected from the group consisting of the above ascorbic acid and derivatives thereof, tocopherols, and citric acid and derivatives thereof. The at least one compound may be selected independently of the optical activity, and any of d form, L form, and dL form may be used. The content of the at least one compound may be 0.05 to 5 parts by weight, preferably 0.5 to 4 parts by weight, based on 100 parts by weight of a diene rubber or a halogenated butyl rubber. When the content is less than 0.05 part by weight, the abrasion resistance, crack resistance, and fatigue resistance cannot be improved, while when it exceeds 5 parts by weight, vulcanization is unfavorably delayed.

The rubber composition used in the tire tread comprises, for example, 100 parts by weight of a diene rubber, 40 to 150 parts by weight of a carbon black, 0 to 150 parts by weight of a process oil, and 0.05 to 5 parts by weight of the above at least one compound.

The rubber composition used in the side wall, rim cushion, and/or inner liner comprises, for example, 100 parts by weight of a diene rubber or a halogenated butyl rubber, 20 to 130 parts by weight of a carbon black, 0.5 to 5 parts by weight of sulfur, and 0.05 to 5 parts by weight of the above at least one compound (particularly, vitamin C). In the case of the inner liner, the use of the halogenated butyl rubber is preferred from the viewpoint of preventing air within the tire from being leaked out.

The rubber composition used in the belt layer, carcass layer, and/or bead filler of the tire comprises, for example, 100 parts by weight of a diene rubber, 20 to 80 parts by weight of a carbon black, 1 to 10 parts by weight of sulfur, and 0.05 to 5 parts by weight of the above at least one compound (particularly, vitamin C).

The diene rubber is not particularly limited, and examples thereof include natural rubber (NR), styrene/butadiene copolymer (SBR), and polybutadiene (BR).

The halogenated butyl rubber also is not particularly limited, and examples thereof include brominated butyl rubber and chlorinated butyl rubber.

Preferably, the rubber composition for a tire according to the present invention further comprises a filler for rubber attached with at least one compound selected from particularly the above described ascorbic acid and its derivatives, tocopherols, and citric acid and its derivatives, when dispersion of the incorporated at least one compound can be facilitated and it is possible to attain the desired result with use of a relatively limited amount of such compound. In this connection, the solubility in rubber of for example the ascorbic acid is so low that if this acid is added directly in rubber, there tends to occur the problem of an insufficient or uneven dispersion, but normally it is that the desired result can be attained without a difficulty if the ascorbic acid is mixed in rubber at a high temperature in the vicinity of the melting point of the acid of 180° to 190° C. However, to add the ascorbic acid directly in rubber, itself, tends to affect the scorch acceleration, and it is not much advisable to mix the ascorbic acid with rubber at such a high temperature as above. In contrast to the above, if the ascorbic acid is added to rubber in the form of the acid being attached to a rubber-use filler as proposed above, it is possible even without raising the mixing temperature to realize a desirable dispersion of the ascorbic acid in rubber and obviate the need for worrying about deterioration of the scorch prevention.

The rubber filler may be any one commonly used for rubber and is not particularly limited. Examples thereof include carbon black, silica, and calcium carbonate.

The adhesion of the at least one compound to the filler for rubber may be performed, for example, by immersing a filler for rubber in a solution containing a dissolved ascorbic acid to coat the surface of the filler with the ascorbic acid. Preferably, the percentage adhesion of the at least one compound to the filler for rubber is 0.01 to 30% by weight based on the weight of the filler for rubber. When the percentage adhesion is less than 0.01% by weight, the effect of improving the abrasion resistance cannot be attained. On the other hand, when it exceeds 30% by weight, some of the at least one compound is present without being adhered to the filler, often posing problems associated with the scorch prevention, the dispersibility and/or the vulcanization rate or progress.

The filler for rubber incorporated may be 40 to 150 parts by weight, based on 100 parts by weight of a diene rubber, in total of the filler for rubber with the at least one compound adhered to thereto and a filler for rubber with the at least one compound not adhered thereto.

The content of the at least one compound (for example, an ascorbic acid compound, that is, ascorbic acid or its derivative) adhered to a filler for rubber is preferably 0.1 to 5 parts by weight based on 100 parts by weight of the diene rubber. When it is less than 0.1 part by weight, the abrasion resistance can not be improved, while when it exceeds 5 parts by weight, the vulcanization is unfavorably delayed.

For example, in the case of a tread for a pneumatic tire for running on a general road, at least one compound adhered to a filler for rubber may be incorporated in an amount of 0.1 to 1 part by weight based on 100 parts by weight of the diene rubber.

On the other hand, in the case of a tread for a pneumatic tire for running on an expressway, the ascorbic acid compound adhered to a filler for rubber may be incorporated in an amount of 0.1 to 5 parts by weight based on 100 parts by weight of the diene rubber.

The present invention will be described with reference to the following examples comparatively with comparative examples, though the invention is not limited to these examples only.

EXAMPLES AND COMPARATIVE EXAMPLES (1) Formulation ingredients (in parts by weight) specified in Table 1 were mixed and kneaded together by means of a Banbury mixer and a mixing roll according to a conventional method to prepare various rubber compositions (Examples 1 to 9 and Comparative Example 1). These rubber compositions were press-vulcanized at 160° C. for 20 to 50 min, thereby preparing test pieces for a tread which were then evaluated for wet performance, fuel economy, fracture properties, and abrasion resistance by the following methods. The results are given in Table 1.

Wet Performance:

A viscoelastic spectrometer manufactured by Toyo Seiki Seisaku Sho, Ltd. was used to measure tan $\delta$ at 0° C. under conditions of distortion factor 10±2% in stretch deformation and frequency 20 Hz. The larger the numerical value, the better the wet performance.

Fuel Economy:

A viscoelastic spectrometer manufactured by Toyo Seiki Seisaku Sho, Ltd. was used to measure tan $\delta$ at 60° C. under conditions of distortion factor 10±2% in stretch deformation and frequency 20 Hz. The smaller the numerical value, the better the fuel economy (the lower the rolling resistance).

Fracture properties:

The fracture properties were evaluated by measuring the tensile strength and the elongation at break. The larger the numerical value, the better the fracture properties (which means that fracture does not occur even upon larger deformation).

Method for measuring tensile strength:

The tensile strength was measured in accordance with the procedure set forth in JIS K6301 (tensile speed 500±25 mm/min, testing temperature 23±2° C., load cell capacity such that the tensile strength falls within 15 to 85% of the capacity, JIS No. 3, and n=3).

Method for measuring elongation at break:

As with the tensile strength, the elongation at break was measured in accordance with the procedure set forth in JIS K6301.

Method for measuring abrasion resistance:

The abrasion resistance was determined by measuring Lambourn resistance under conditions of slip 25% and load 5 kg in accordance with the procedure set forth in JIS K6264. The results were expressed in terms of an index by taking the abrasion value in Comparative Example 1 as 100. The larger the numeral value, the better the abrasion resistance.

TABLE 1

|  | Ex. 1 | Ex. 2 | Ex. 3 | Ex. 4 | Ex. 5 | Ex. 6 | Ex. 7 | Ex. 8 | Ex. 9 | Comp. Ex. 1 |
| --- | --- | --- | --- | --- | --- | --- | --- | --- | --- | --- |
| SBR | 100 | 100 | 100 | 100 | 100 | 100 | 100 | 100 | 100 | 100 |
| Carbon black (SAF) | 90 | 90 | 90 | 90 | 90 | 90 | 90 | 90 | 90 | 90 |
| Aromatic oil | 53.0 | 53.0 | 53.0 | 52.6 | 52.6 | 52.6 | 52.8 | 52.8 | 52.8 | 55.0 |
| L-Ascorbic acid | 1.0 | 2.0 | 4.0 | | | | | | | |
| dl-α-Tocopherol | | | | 1.2 | 2.4 | 4.8 | | | | |
| Citric acid | | | | | | | 1.1 | 2.2 | 4.4 | |
| Zinc flower | 3 | 3 | 3 | 3 | 3 | 3 | 3 | 3 | 3 | 3 |

TABLE 1-continued

|  | Ex. 1 | Ex. 2 | Ex. 3 | Ex. 4 | Ex. 5 | Ex. 6 | Ex. 7 | Ex. 8 | Ex. 9 | Comp. Ex. 1 |
|---|---|---|---|---|---|---|---|---|---|---|
| Stearic acid | 2 | 2 | 2 | 2 | 2 | 2 | 2 | 2 | 2 | 2 |
| Vulcanization accelerator* | 1.7 | 1.7 | 1.7 | 1.7 | 1.7 | 1.7 | 1.7 | 1.7 | 1.7 | 1.7 |
| Sulfur | 2.4 | 2.4 | 2.4 | 2.4 | 2.4 | 2.4 | 2.4 | 2.4 | 2.4 | 2.4 |
| Tensile strength, room temp./MPa | 21.0 | 20.1 | 21.9 | 21.8 | 21.1 | 21.2 | 21.1 | 21.5 | 21.8 | 21.2 |
| Elongation at break, room temp./% | 557 | 510 | 507 | 487 | 490 | 499 | 510 | 520 | 456 | 457 |
| Lambourn abrasion, 25% slip Abrasion resistance index (%) Load 5 kg | 107 | 112 | 137 | 102 | 104 | 106 | 103 | 102 | 113 | 100 |
| Stretch viscoelasticity tan δ, 0° C. | 0.786 | 0.790 | 0.770 | 0.789 | 0.787 | 0.772 | 0.782 | 0.763 | 0.770 | 0.769 |
| Stretch viscoelasticity tan δ, 60° C. | 0.409 | 0.394 | 0.402 | 0.397 | 0.385 | 0.399 | 0.409 | 0.399 | 0.402 | 0.400 |
| JIS hardness | 67.4 | 68.8 | 67.4 | 70.6 | 70.0 | 68.8 | 69.4 | 70.2 | 68.4 | 71.2 |

Note) *: A mixture of N-cyclohexyl-2-benzothiazylsulfenamide with diphenylguanidine As is apparent from Table 1, the rubber compositions of the present invention (Examples 1 to 9) are superior in abrasion resistance without sacrificing wet performance, fuel economy, and fracture properties to the rubber composition not containing the above at least one compound (Comparative Example 1). Among all the compounds used, the ascorbic acid is seen to be most effective.

In connection with representative rubber compositions for tires provided with use of the ascorbic acid, their physical properties were examined, and results of the examinations are shown in the following:

(2) Formulation ingredients (in parts by weight) specified in Table 2 were mixed and kneaded together by means of a Banbury mixer and a mixing roll according to a conventional method to prepare various rubber compositions (Examples 10 to 12 and Comparative Example 2). These rubber compositions were press-vulcanized at 160° C. for 20 to 50 min, thereby preparing test pieces for a side wall which were then evaluated for crack resistance and processability by the following methods and, in addition, evaluated for fracture properties in the same manner as described in the above item (1). The results are given in Table 2.

Crack resistance:

(1) Before heat aging (flex cracking test)

The crack resistance before heat aging was determined by determining the crack growth upon repeated flexing with a de Mattia flexing tester in accordance with the procedure set forth in JIS K6301. The crack growth under conditions of stroke 57 mm, speed 300±10 rpm, and 100,000 flexing cycles by taking the crack growth in Comparative Example 2 as 100. The larger the numerical value, the better the crack resistance.

(2) After heat aging (flex cracking test)

Heat aging was conducted in a gear oven at 80° C. for 144 hr followed by determination of the crack growth in the same manner as described above in connection with the crack resistance before heat aging.

Processability:

The processability was evaluated by measuring the time taken for the viscosity to be increased by 5 Mooney at 125° C. in accordance with the procedure set forth in JIS K6300. The smaller the numerical value, the better the processability.

TABLE 2

|  | Comp. Ex. 2 | Ex. 10 | Ex. 11 | Ex. 12 |
|---|---|---|---|---|
| NR | 40 | 40 | 40 | 40 |
| BR | 60 | 60 | 60 | 60 |
| Carbon black | 50 | 50 | 50 | 50 |
| L-Ascorbic acid |  | 0.5 | 1.0 | 2.0 |
| Aromatic oil | 15.0 | 15.0 | 15.0 | 15.0 |
| Zinc flower | 3.0 | 3.0 | 3.0 | 3.0 |
| Stearic acid | 2.0 | 2.0 | 2.0 | 2.0 |
| Antioxidant-1 | 3.0 | 3.0 | 3.0 | 3.0 |
| Antioxidant-2 | 2.0 | 2.0 | 2.0 | 2.0 |
| Wax | 1.5 | 1.5 | 1.5 | 1.5 |
| Sulfur | 1.5 | 1.5 | 1.5 | 1.5 |
| Vulcanization accelerator | 1.0 | 1.0 | 1.0 | 1.0 |
| Cracking resistance Flex cracking test |  |  |  |  |
| Before heat aging | 100 | 106 | 108 | 112 |
| After heat aging | 75 | 86 | 88 | 91 |
| Processability Scorching time (min) | 25 | 20 | 19 | 16 |
| Breaking properties |  |  |  |  |
| Tensile strength @ Room temp/MPa | 8.0 | 7.8 | 7.6 | 7.3 |
| Elongation at break @ Room temp./% | 560 | 570 | 580 | 600 |

Note)
NR: SIR-20
BR: Nipol 1220, manufactured by Nippon Zeon Co., Ltd.
Carbon black: SEAST N ($N_2SA$ = 74 $m^2/g$), manufactured by Tokai Carbon Co., Ltd.
Aromatic oil: Process oil X-140, manufactured by Kyodo Oil Co., Ltd.
Zinc flower: Zinc flower No. 3, manufactured by Seido Chemical Industry Co., Ltd.
Stearic acid: Lunac YA, manufactured by Kao Corp.
Antioxidant-1: N-Phenyl-N'-(1,3-dimethyl)-p-phenylenediamine (Antigene 6C, manufactured by Sumitomo Chemical Co., Ltd.)
Antioxidant-2: Poly-(2,2,4-trimethyl-1,2-dihydroquinoline) (Antigene RD, manufactured by Sumitomo Chemical Co., Ltd.)
Wax: Sunnoc, manufactured by Ohuchi Shinko Chemical Industrial Co., Ltd.
Sulfur: Oil-treated sulfur
Vulcanization accelerator: N-Cyclohexyl-2-benzothiazolesulfenamide (Nocceler CZ, manufactured by Ohuchi Shinko Chemical Industrial Co., Ltd.)

As is apparent from Table 2, the rubber compositions of the present invention (Examples 10 to 12) were superior in crack resistance to the rubber composition not containing ascorbic acid (Comparative Example 2).

(3) Formulation ingredients (in parts by weight) specified in Table 3 were mixed and kneaded together by means of a Banbury mixer and a mixing roll according to a conventional method to prepare various rubber compositions (Examples 13 to 15 and Comparative Example 3). These rubber compositions were press-vulcanized at 160° C. for 20 to 50 min, thereby preparing test pieces for an inner liner which were then evaluated for crack resistance, processability, and fracture properties in the same manner as described in the above item (2). The results are given in Table 3.

TABLE 3

|  | Comp. Ex. 3 | Ex. 13 | Ex. 14 | Ex. 15 |
|---|---|---|---|---|
| IIR | 75 | 75 | 75 | 75 |
| NR | 25 | 25 | 25 | 25 |
| Carbon black | 60 | 60 | 60 | 60 |
| L-Ascorbic acid |  | 0.5 | 1.0 | 2.0 |
| Aromatic oil | 4.0 | 4.0 | 4.0 | 4.0 |
| Zinc flower | 3.0 | 3.0 | 3.0 | 3.0 |
| Stearic acid | 1.0 | 1.0 | 1.0 | 1.0 |
| Sulfur | 0.8 | 0.8 | 0.8 | 0.8 |
| Vulcanization accelerator | 1.0 | 1.0 | 1.0 | 1.0 |
| Cracking resistance |  |  |  |  |
| Flex cracking test |  |  |  |  |
| Before heat aging | 100 | 110 | 109 | 111 |
| After heat aging | 57 | 77 | 80 | 84 |
| Processability | 19 | 18 | 17 | 14 |
| Scorching time (min) |  |  |  |  |
| Breaking properties |  |  |  |  |
| Tensile strength | 8.0 | 7.8 | 7.6 | 7.4 |
| @ Room temp./MPa |  |  |  |  |
| Elongation at break | 720 | 700 | 730 | 740 |
| @ Room temp./% |  |  |  |  |

Note)
NR: SIR-20
IIR: Brominated isobutylene isoprene rubber
Carbon black: SEAST V ($N_2SA$ = 27 $m^2/g$), manufactured by Tokai Carbon Co., Ltd.
Aromatic oil: Process oil X-140, manufactured by Kyodo Oil Co., Ltd.
Zinc flower: Zinc flower No. 3, manufactured by Seido Chemical Industry Co., Ltd.
Stearic acid: Lunac YA, manufactured by Kao Corp.
Sulfur: Oil-treated sulfur
Vulcanization accelerator: Dibenzothiazyl disulfide (Sanceler DM, manufactured by Sanshin Chemical Industry Co., Ltd.)

As is apparent from Table 3, the rubber compositions of the present invention (Examples 13 to 15) were superior in crack resistance to the rubber composition not containing ascorbic acid (Comparative Example 3).

(4) Formulation ingredients (in parts by weight) specified in Table 4 were mixed and kneaded together by means of a Banbury mixer and a mixing roll according to a conventional method to prepare various rubber compositions (Examples 16 to 18 and Comparative Example 4). These rubber compositions were press-vulcanized at 160° C. for 20 to 50 min, thereby preparing test pieces for a belt layer which were then evaluated for fatigue resistance, initial adhesion, and adhesion after immersion in warm water by the following methods and, in addition, evaluated for processability and fracture properties in the same manner as described in the above item (2). The results are given in Table 4. For the evaluation of the initial adhesion and the adhesion after immersion in warm water, another test sample was provided.

Fatigue resistance:

(1) Strain-controlled fatigue life (before heat aging)

The strain-controlled fatigue life before heat aging was measured in accordance with the procedure set forth in JIS K6301, that is, by repeatedly applying a constant strain of 100% to a No. 3 dumbbell for 15 min at 160° C. to measure the number of cycles required to cause fracture. The number of cycles required to cause fracture was measured for six dumbbells, i.e., n=6, and the probability of 50% survival was determined by normal probability distribution based on the number of cycles required to cause fracture, and the fatigue life was expressed in terms of an index by taking the probability of 50% survival in Comparative Example 4 as 100. The larger the numerical value, the longer the fatigue life.

(2) Strain-controlled fatigue life (after heat aging)

Heat aging was conducted in a gear oven at 80° C. for 96 hr followed by measurement of the number of cycles required to cause fracture in the same manner as described above in connection with the strain-controlled fatigue life before heat aging.

Initial adhesion:

A plurality of brass-plated steel cords (cord structure: 1×5) were placed parallel to each other at intervals of 12.5 mm to form a long material both sides of which were then coated with the rubber composition to embed the long material in the rubber composition. The rubber composition with the long material embedded therein was brought to a fabric having a width of 25 mm which was then vulcanized for 20 min at 170° C. to prepare a test sample. The steel cord was pulled out from the test sample in accordance with ASTM-D-2 to evaluate the coverage (%) of the coating rubber coating the surface of the pulled-out cord. The larger the numerical value, the better the initial adhesion.

Adhesion after immersion in warm water:

The test sample prepared for the evaluation of the initial adhesion was used as a sample for pulling out the cord by hand. The lower end cord of this sample was cut, followed by immersion and standing in warm water of 70° C. for 4 weeks. Thereafter, the cord was pulled out to evaluate the degree of deterioration in adhesion caused by penetration of water due to an external damage in the same manner as described above in connection with the evaluation of the initial adhesion.

TABLE 4

|  | Comp. Ex. 4 | Ex. 16 | Ex. 17 | Ex. 18 |
|---|---|---|---|---|
| NR | 100 | 100 | 100 | 100 |
| Carbon black | 63 | 63 | 63 | 63 |
| L-Ascorbic acid |  | 0.5 | 1.0 | 2.0 |
| Aromatic oil | 4.0 | 4.0 | 4.0 | 4.0 |
| Zinc flower | 10.0 | 10.0 | 10.0 | 10.0 |
| Cobalt naphthenate | 3.0 | 3.0 | 3.0 | 3.0 |
| Antioxidant | 1.0 | 1.0 | 1.0 | 1.0 |
| Sulfur | 8.0 | 8.0 | 8.0 | 8.0 |
| Vulcanization accelerator | 0.5 | 0.5 | 0.5 | 0.5 |
| Cresol resin | 1.0 | 1.0 | 1.0 | 1.0 |
| Partial condensate of hexamethylolmelamine pentamethyl ether | 5.0 | 5.0 | 5.0 | 5.0 |
| Fatigue resistance |  |  |  |  |
| Strain-controlled fatigue life (before heat aging) (Strain = 100%) | 100 | 108 | 107 | 111 |
| Strain-controlled fatigue life (after heat aging) (Strain = 100%) | 55 | 73 | 82 | 84 |
| Processability Scorching time (min) | 28 | 27 | 25 | 22 |
| Breaking properties |  |  |  |  |
| Tensile strength @ Room temp./MPa | 22.0 | 20.0 | 20.5 | 19.6 |
| Elongation at break @ Room temp./% | 380 | 370 | 380 | 390 |
| Initial adhesion | 95 | 95 | 95 | 95 |
| Adhesion after immersion in | 60 | 65 | 60 | 60 |

TABLE 4-continued

|  | Comp. Ex. 4 | Ex. 16 | Ex. 17 | Ex. 18 |
|---|---|---|---|---|
| warm water (hot water resistance) | | | | |

Note)
NR: RSS #1
Carbon black: SEAST 300, manufactured by Tokai Carbon Co., Ltd.
Aromatic oil: Process oil X-140, manufactured by Kyodo Oil Co., Ltd.
Zinc flower: Zinc flower R, manufactured by Toho Zinc Co., Ltd.
Antioxidant: N-Phenyl-N'-(1,3-dimethyl)-p-phenylenediamine (Antigene 6C, manufactured by Sumitomo Chemical Co. Ltd.)
Sulfur: Insoluble sulfur (20% oil-treated)
Vulcanization accelerator: N,N'-Dicyclohexyl-2-dithiazolesulfenamide (Accel DZ-G, manufactured by Kawaguchi Chemical Industry Co., Ltd.)
Cresol resin: SUMIKANOL 610, manufactured by Sumitomo Chemical Co., Ltd,
Partial condensate of hexamethylolmelamine pentamethyl ether: SUMI-KANOL 507 (content of partial condensate: 50%), manufactured by Sumitomo Chemical Co., Ltd.

As is apparent from Table 4, the rubber compositions of the present invention (Examples 16 to 18) were superior in fatigue resistance to the rubber composition not containing ascorbic acid (Comparative Example 4).

(5) Formulation ingredients (in parts by weight) specified in Table 5 were mixed and kneaded together by means of a Banbury mixer and a mixing roll according to a conventional method to prepare various rubber compositions (Examples 19 to 21 and Comparative Example 5). These rubber compositions were press-vulcanized at 160° C. for 20 to 50 min, thereby preparing test pieces for a bead filler which were then evaluated for fatigue resistance, processability, and fracture properties in the same manner as described in the above item (4). The results are given in Table 5.

TABLE 5

|  | Comp. Ex. 5 | Ex. 19 | Ex. 20 | Ex. 21 |
|---|---|---|---|---|
| NR | 80 | 80 | 80 | 80 |
| SBR | 20 | 20 | 20 | 20 |
| Carbon black | 70 | 70 | 70 | 70 |
| L-Ascorbic acid |  | 0.5 | 1.0 | 2.0 |
| Aromatic oil | 8.0 | 8.0 | 8.0 | 8.0 |
| Zinc flower | 5.0 | 5.0 | 5.0 | 5.0 |
| Stearic acid | 2.0 | 2.0 | 2.0 | 2.0 |
| Antioxidant | 1.0 | 1.0 | 1.0 | 1.0 |
| Sulfur | 3.5 | 35 | 3.5 | 35 |
| Vulcanization accelerator | 1.0 | 1.0 | 1.0 | 1.0 |
| Fatigue resistance | | | | |
| Strain-controlled fatigue life (before heat aging) (Strain = 100%) | 100 | 108 | 108 | 111 |
| Strain-controlled fatigue life (after heat aging) (Strain = 100%) | 67 | 88 | 89 | 86 |
| Processability Scorching time (min) | 22 | 20 | 18 | 15 |
| Breaking properties | | | | |
| Tensile strength @ Room temp./MPa | 18.3 | 18.0 | 17.4 | 17.2 |
| Elongation at break @ Room temp./% | 260 | 250 | 240 | 280 |

Note)
NR: SIR-20
BR: Nipol 1502, manufactured by Nippon Zeon Co. Ltd.
Carbon black: SEAST N ($N_2SA$ = 74 $m^2/g$), manufactured by Tokai Carbon Co., Ltd.
Aromatic oil: Process oil X-140, manufactured by Kyodo Oil Co., Ltd.
Zinc flower: Zinc flower No. 3, manufactured by Seido Chemical Industry Co., Ltd.
Stearic acid: Lunac YA, manufactured by Kao Corp.
Antioxidant: N-Phenyl-N'-(1,3-dimethyl)-p-phenylenediamine (Antigene 6C, manufactured by Sumitomo Chemical Co., Ltd.)
Sulfur: Insoluble sulfur (20% oil-treated)
Vulcanization accelerator: N-Tert-butyl-2-benzothiazolylsulfenamide (Nocceler NS-F, manufactured by Ohuchi Shinko Chemical Industrial Co., Ltd.)

As is apparent from Table 5, the rubber compositions of the present invention (Examples 19 to 21) were superior in fatigue resistance to the rubber composition not containing ascorbic acid (Comparative Example 5).

(6) Then, using an ascorbic acid compound preparatively attached to silica or carbon black (these are each a filler for rubber), formulation ingredients (in parts by weight) specified in Table 6 were mixed and kneaded together by means of a Banbury mixer and a mixing roll according to a conventional method to prepare various rubber compositions (Examples 22 to 33 and Comparative Example). These rubber compositions were used to constitute treads of pneumatic tires for running on a general road which were then evaluated for abrasion resistance (Lambourn abrasion), processability (scorching time and dispersibility), and fracture properties (tensile strength and elongation at break) by the following methods. The results are given in Table 6.

Abrasion resistance:

Abrasion quantity was measured by a Lambourn abrasion test specified in JIS K6264 and expressed in terms of an index by taking the abrasion quantity in Comparative Example 6 as 100. The larger the numerical value, the better the abrasion resistance.

Processability:

The scorching time was evaluated by measuring the time taken for the torque to be increased by 5 points at 125° C. in accordance with the procedure set forth in JIS K6300. The larger the numerical value, the better the processability.

The dispersibility was evaluated by cutting the vulcanized rubber with a sharp cutter, and the cut surface was inspected visually and under an optical microscope. "O" represents that no mass derived from poor dispersion was observed and homogeneous dispersion was attained; "Δ" represents that dispersion to some extent was attained although masses derived from poor dispersion were observed here and there; and "X" represents that a large number of masses derived from poor dispersion were observed.

Fracture properties:

The fracture properties were evaluated by measuring the tensile strength and the elongation at break. The larger the numerical value, the better the fracture properties (which means that fracture does not occur even upon larger deformation).

Method for measuring tensile strength:

The tensile strength was measured in accordance with the procedure set forth in JIS K6301 (tensile speed 500±25 mm/min, testing temperature 23°±2° C., load cell capacity such that the tensile strength falls within 15 to 85% of the capacity, JIS No. 3, and n=3).

Method for measuring elongation at break:

As with the tensile strength, the elongation at break was measured in accordance with the procedure set forth in JIS K6301.

TABLE 6

| | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Comp. Ex. 6 L-Ascorbic acid not added |
|---|---|---|---|---|---|---|---|---|---|---|---|---|---|
| | Coating carbon black | | | | Coating silica | | | | Directly introduced | | | | |
| SBR*[1] | 100 | 100 | 100 | 100 | 100 | 100 | 100 | 100 | 100 | 100 | 100 | 100 | 100 |
| Carbon black (SAF) | 40(45) | 40(45) | 40(45) | 40(45) | 45 | 45 | 45 | 45 | 45 | 45 | 45 | 45 | 45 |
| Silica | 5 | 5 | 5 | 5 | (5) | (5) | (5) | (5) | 5 | 5 | 5 | 5 | 5 |
| Surface-treated CB1*[2] | 5.1 | | | | | | | | | | | | |
| Surface-treated CB2*[2] | | 5.3 | | | | | | | | | | | |
| Surface-treated CB3*[2] | | | 5.6 | | | | | | | | | | |
| Surface-treated CB4*[2] | | | | 6 | | | | | | | | | |
| Surface-treated silica 1*[3] | | | | | 6.1 | | | | | | | | |
| Surface-treated silica 2*[3] | | | | | | 6.3 | | | | | | | |
| Surface-treated silica 3*[3] | | | | | | | 6.6 | | | | | | |
| Surface-treated silica 4*[3] | | | | | | | | 7 | | | | | |
| L-Ascorbic acid | (0.1) | (0.3) | (0.6) | (1) | (0.1) | (0.3) | (0.6) | (1) | 0.1 | 0.3 | 0.6 | 1 | 0 |
| Dispersant*[4] | 1 | 1 | 1 | 1 | (1) | (1) | (1) | (1) | 1 | 1 | 1 | 1 | 1 |
| Aromatic oil | 8 | 8 | 8 | 8 | 8 | 8 | 8 | 8 | 8 | 8 | 8 | 8 | 8 |
| Zinc flower | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Vulcanization accelerator*[5] | 1.6 | 1.6 | 1.6 | 1.6 | 1.6 | 1.6 | 1.6 | 1.6 | 1.6 | 1.6 | 1.6 | 1.6 | 1.6 |
| Sulfur | 2.4 | 2.4 | 2.4 | 2.4 | 2.4 | 2.4 | 2.4 | 2.4 | 2.4 | 2.4 | 2.4 | 2.4 | 2.4 |
| Abrasion resistance Lambourn abrasion Abrasion index (%) | 103 | 113 | 112 | 108 | 104 | 115 | 114 | 110 | 102 | 105 | 109 | 117 | 100 |
| Processability | | | | | | | | | | | | | |
| Scorching time (min) | 34.0 | 30.5 | 20.5 | 16.4 | 34.3 | 31.8 | 22.5 | 22.2 | 33.7 | 28.6 | 16.4 | 21.8 | 37.1 |
| Dispersibility | ○ | ○ | ○ | ○ | ○ | ○ | ○ | ○ | Δ | x | x | x | ○ |
| Fracture properties | | | | | | | | | | | | | |
| Tensile strength @ Room temp./MPa | 22.1 | 24.1 | 23.0 | 21.8 | 23.0 | 22.6 | 22.8 | 22.2 | 22.5 | 22.3 | 23.5 | 21.8 | 23.1 |
| Elongation at break @ Room temp./% | 438 | 448 | 452 | 447 | 435 | 440 | 450 | 447 | 433 | 435 | 434 | 419 | 430 |

Note)
*Numerical value within the parentheses indicates a total value including the amount of L-ascorbic acid contained in the filler having a surface treated with L-ascorbic acid. The surface treatment of the filler (carbon black or silica) with vitamin C was conducted by the following steps (a) to (d).
(a) Prepare a solution of a necessary amount of L-ascorbic acid dissolved in methanol in an amount of at least twice the weight of the filler to be surface-treated.
(b) In the case of silica, add 20% by weight, based on the silica, of diethylene glycol to the methanol solution.
(c) Immerse the filler in this solution for 24 hr.
(d) Dry at room temperature.
*[1]: SBR 1502
*[2]: Details of carbon blacks (CB) the surface of which was coated with L-ascorbic acid

| | L-Ascorbic acid | CB |
|---|---|---|
| Surface-treated CB1 | 0.1 phr | 5 phr |
| Surface-treated CB2 | 0.3 phr | 5 phr |
| Surface-treated CB3 | 0.6 phr | 5 phr |
| Surface-treated CB4 | 1 phr | 5 phr |

*[3]: Details of silicas the surface of which was coated with L-ascorbic acid

| | L-Ascorbic acid | Silica | Dispersant*[4] |
|---|---|---|---|
| Surface-treated silica 1 | 0.1 phr | 5 phr | 1 phr |
| Surface-treated silica 2 | 0.3 phr | 5 phr | 1 phr |
| Surface-treated silica 3 | 0.6 phr | 5 phr | 1 phr |
| Surface-treated silica 4 | 1 phr | 5 phr | 1 phr |

*[4]: Diethylene glycol (coated on the surface of silica for the purpose of improving the dispersibility of silica)
*[5]: A mixture of N-cyclohexyl-2-benzothiazyl-sulfenamide with diphenylguanidine In Table 6, for Examples 22 to 25, carbon black (CB) having a surface coated with ascorbic acid was used; for Examples 26 to 29, silica having a surface coated with ascorbic acid was used; for Examples 30 to 33, carbon black, silica, and ascorbic acid were directly introduced in a separate manner; and for Comparative Example 6, ascorbic acid was not used.

As is apparent from Table 6, the rubber compositions of the present invention using carbon black or silica having a surface coated with ascorbic acid in an amount of 0.1 to 1 phr (part by weight based on 100 parts by weight of the rubber) (Examples 22 to 29) had better abrasion resistance than that of Comparative Example 6 and an improved dispersibility, and even although the use amount of the ascorbic acid was relatively limited, attained a higher effect of improvement relating to the abrasion resistance when compared with the compositions of Examples 30 to 33.

(7) Also, similar to the above, formulation ingredients (in parts by weight) specified in Table 7 were mixed and kneaded together by means of a Banbury mixer and a mixing roll according to a conventional method to prepare various rubber compositions (Examples 34 to 45 and Comparative Example 7). These rubber compositions were used to constitute treads of pneumatic tires for running on an expressway which were then evaluated for abrasion resistance (Lambourn abrasion), processability (scorching time and dispersibility), and fracture properties (tensile strength and elongation at break) in the same manner as described in the above item (6). The results are given in Table 7.

TABLE 7

| | Ex. 34 | Ex. 35 | Ex. 36 | Ex. 37 | Ex. 38 | Ex. 39 | Ex. 40 | Ex. 41 | Ex. 42 | Ex. 43 | Ex. 44 | Ex. 45 | Comp. Ex. 7 L-Ascorbic acid not added |
| --- | --- | --- | --- | --- | --- | --- | --- | --- | --- | --- | --- | --- | --- |
| | Coating carbon black | | | | Coating silica | | | | Directly introduced | | | | |
| Nipol 9502*[1] | 137.5 | 137.5 | 137.5 | 137.5 | 137.5 | 137.5 | 137.5 | 137.5 | 137.5 | 137.5 | 137.5 | 137.5 | 137.5 |
| Carbon black (SAF) | 60(80) | 60(80) | 60(80) | 60(80) | 80 | 80 | 80 | 80 | 80 | 80 | 80 | 80 | 80 |
| Silica | 20 | 20 | 20 | 20 | (20) | (20) | (20) | (20) | 20 | 20 | 20 | 20 | 20 |
| Surface-treated CB1*[2] | 20.1 | | | | | | | | | | | | |
| Surface-treated CB2*[2] | | 22 | | | | | | | | | | | |
| Surface-treated CB3*[2] | | | 24 | | | | | | | | | | |
| Surface-treated CB4*[2] | | | | 26 | | | | | | | | | |
| Surface-treated silica 1*[3] | | | | | 21.1 | | | | | | | | |
| Surface-treated silica 2*[3] | | | | | | 23 | | | | | | | |
| Surface-treated silica 3*[3] | | | | | | | 25 | | | | | | |
| Surface-treated silica 4*[3] | | | | | | | | 27 | | | | | |
| L-Ascorbic acid | (0.1) | (2) | (4) | (5) | (0.1) | (2) | (4) | (5) | 0.1 | 2 | 4 | 5 | 0 |
| Dispersant*[4] | 1 | 1 | 1 | 1 | (1) | (1) | (1) | (1) | 1 | 1 | 1 | 1 | 1 |
| Aromatic oil | 25 | 25 | 25 | 25 | 25 | 25 | 25 | 25 | 25 | 25 | 25 | 25 | 25 |
| Zinc flower | 3 | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 | 2 |
| Vulcanization accelerator*[5] | 1.6 | 1.6 | 1.6 | 1.6 | 1.6 | 1.6 | 1.6 | 1.6 | 1.6 | 1.6 | 1.6 | 1.6 | 1.6 |
| Sulfur | 2.4 | 2.4 | 2.4 | 2.4 | 2.4 | 2.4 | 2.4 | 2.4 | 2.4 | 2.4 | 2.4 | 2.4 | 2.4 |
| Abrasion resistance Lambourn abrasion Abrasion index (%) | 104 | 113 | 112 | 105 | 103 | 111 | 114 | 107 | 102 | 107 | 112 | 110 | 100 |
| Processability | | | | | | | | | | | | | |
| Scorching time (min) | 25.0 | 22.1 | 20.4 | 15.7 | 25.3 | 21.7 | 20.1 | 20.1 | 25.0 | 13.2 | 8.3 | 7.5 | 26.2 |
| Dispersibility | ○ | ○ | ○ | ○ | ○ | ○ | ○ | ○ | Δ | x | x | x | ○ |
| Fracture properties | | | | | | | | | | | | | |
| Tensile strength @ Room temp./MPa | 20.1 | 20.0 | 20.4 | 21.0 | 21.0 | 20.1 | 20.4 | 21.9 | 20.9 | 21.6 | 20.2 | 21.3 | 20.8 |
| Elongation at break @ Room temp./% | 472 | 594 | 570 | 579 | 483 | 560 | 569 | 580 | 470 | 557 | 510 | 508 | 461 |

Note)
*Numerical value within the parentheses indicates a total value including the amount of L-ascorbic acid contained in the filler having a surface treated with L-ascorbic acid. The surface treatment of the filler (carbon black or silica) with L-ascorbic acid was conducted by the following steps (a) to (d).
(a) Prepare a solution of a necessary amount of L-ascorbic acid dissolved in methanol in an amount of twice the weight of the filler to be surface-treated.
(b) In the case of silica, add 5% by weight, based on the silica, of diethylene glycol to the methanol solution.
(c) Immerse the filler in this solution for 24 hr.
(d) Dry at room temperature.
*[1]: Oil extended SBR (amount of oil: 37.5 phr)
*[2]: Details of carbon blacks (CB) the surface of which was coated with L-ascorbic acid

| | L-Ascorbic acid | CB |
| --- | --- | --- |
| Surface-treated CB1 | 0.1 phr | 20 phr |
| Surface-treated CB2 | 2 phr | 20 phr |

TABLE 7-continued

| | | |
|---|---|---|
| Surface-treated CB3 | 4 phr | 20 phr |
| Surface-treated CB4 | 5 phr | 20 phr |

*3: Details of silicas the surface of which was coated with L-ascorbic acid

| | L-Ascorbic acid | Silica | Dispersant*4 |
|---|---|---|---|
| Surface-treated silica 1 | 0.1 phr | 20 phr | 1 phr |
| Surface-treated silica 2 | 2 phr | 20 phr | 1 phr |
| Surface-treated silica 3 | 4 phr | 20 phr | 1 phr |
| Surface-treated silica 4 | 5 phr | 20 phr | 1 phr |

*4: Diethylene glycol (coated on the surface of silica for the purpose of improving the dispersibility of silica)
*5: A mixture of N-cyclohexyl-2-benzothiazyl-sulfenamide with diphenylguanidine In Table 7, for Examples 34 to 37, carbon black (CB) having a surface coated with ascorbic acid was used; for Examples 38 to 41, silica having a surface coated with ascorbic acid was used; for Examples 42 to 45, carbon black, silica and ascorbic acid were directly introduced in a separate manner; and for Comparative Example 7, ascorbic acid was not used.

As is apparent from Table 7, the rubber compositions of the present invention using carbon black or silica having a surface coated with ascorbic acid in an amount of 0.1 to 5 phr (Examples 34 to 39) had a better abrasion resistance than that of Comparative Example 7, were improved in or relating to the dispersibility and the scorch prevention and not degraded with respect to the fracture properties when compared with the compositions of Examples 42 to 45.

As described above, according to the present invention, by virtue of the incorporation of at least one compound selected from the group consisting of ascorbic acid and derivatives thereof, tocopherols, and citric acid and derivatives thereof, it is possible to provide a rubber composition for a tire which can improve the abrasion resistance without sacrificing wet performance, fracture properties, and heat build-up and, at the same time, has enhanced crack resistance and fatigue resistance and, hence, can improve tire durability.

What is claimed is:

1. A tire comprising parts including a tread, a sidewall, an inner liner, a belt layer and a bead filler, at least one of said tread, said sidewall, said inner liner, said belt layer and said bead filler being made of a rubber composition comprising (1) 0.05 to 5 parts by weight of at least one compound selected from the group consisting of ascorbic acid and a derivative thereof, tocopherol, and citric acid and a derivative thereof, and (2) 100 parts by weight of diene rubber or halogenated butyl rubber.

2. A tire as claimed in claim 1, wherein said derivative of ascorbic acid is ascorbyl stearate, ascorbyl palmitate or magnesium ascorbate.

3. A tire as claimed in claim 1, wherein said tocopherol is α-tocopherol, β-tocopherol, γ-tocopherol, δ-tocopherol, $\xi_2$-tocopherol, η-tocopherol, ε-tocopherol or $\xi_1$-tocopherol.

4. A tire as claimed in claim 1, wherein said derivative of citric acid is triallyl citrate or magnesium citrate.

5. A tire comprising parts including a tread, a sidewall, an inner liner, a belt layer and a bead filler, at least one of said tread, said sidewall, said inner liner, said belt layer and said bead filler being made of a rubber composition comprising diene rubber or halogenated butyl rubber blended with a compound-attached filler obtained by attaching to a filler for rubber at least one compound selected from the group consisting of ascorbic acid and derivative thereof, tocopherol, and citric acid and a derivative thereof, said compound-attached filler being blended in an amount of 0.05 to 5 parts by weight of said at least one compound per 100 parts by weight of said diene rubber or halogenated butyl rubber.

6. A tire as claimed in claim 5, wherein said at least one compound is attached to said filler for rubber in an amount of 0.01 to 30% based on the weight of the filler for rubber.

7. A tire as claimed in claim 5, wherein said compound-attached filler is blended together with the filler for rubber without the compound attached thereto in a total amount of 40 to 150 parts by weight to 100 parts by weight of said diene rubber.

8. A tire as claimed in claim 5, wherein said filler for rubber is carbon black, silica or calcium carbonate.

9. A tire as claimed in claim 5, wherein said derivative of ascorbic acid is ascorbyl stearate, ascorbyl palmitate or magnesium ascorbate.

10. A tire as claimed in claim 5, wherein said tocopherol is α-tocopherol, β-tocopherol, γ-tocopherol, δ-tocopherol, $\xi_2$-tocopherol, η-tocopherol, ε-tocopherol or $\xi_1$-tocopherol.

11. A tire as claimed in claim 5, wherein said derivative of citric acid is triallyl citrate or magnesium citrate.

12. A method of producing a tire comprising the steps of blending 0.05 to 5 parts by weight of at least one compound selected from the group consisting of ascorbic acid and a derivative thereof, tocopherol, and citric acid and a derivative thereof with 100 parts by weight of diene rubber or halogenated butyl rubber to provide a rubber composition and forming at least one of a tread, a sidewall, an inner liner, a belt layer and a bead filler of the tire with said rubber composition.

13. A method of producing a tire comprising the steps of attaching to a filler for rubber at least one compound selected from the group consisting of ascorbic acid and a derivative thereof, tocopherol, and citric acid and a derivative thereof to provide a compound-attached filler, blending said compound-attached filler in an amount of 0.05 to 5 parts by weight of said at least one compound with 100 parts by weight of diene rubber or halogenated butyl rubber to provide a rubber composition, and forming at least one of a tread, a sidewall, an inner liner, a belt layer and a bead filler of the tire with said rubber composition.

* * * * *